United States Patent Office 3,474,135
Patented Oct. 21, 1969

3,474,135
N-(ω-AMINOALKYLENE)-AMINOALKYL
SULFONIC ACIDS
Ferdinand Bodesheim, Dormagen-Horrem, Wolfgang
Giessler, Dusseldorf, and Günther Nischk, Leverkusen, Germany, assignors to Farbenfabriken Bayer
Aktiengesellschaft, Leverkusen, Germany, a corporation of Germany
No Drawing. Filed Dec. 22, 1964, Ser. No. 420,438
Claims priority, application Germany, Jan. 16, 1964,
F 41,757
Int. Cl. C07c *143/14*
U.S. Cl. 260—513                                  2 Claims

ABSTRACT OF THE DISCLOSURE

This specification discloses a novel group of N-(ω-aminoalkylene)-aminoalkyl sulfonic acids. There is further disclosed a novel process for the production of these materials by the reaction of alkyl sultones having about 3 to 7 carbon atoms in the alkyl group with alkylene diprimary amines having about 2 to 12 carbon atoms in the alkylene group. Specifically disclosed are N - (6 - aminohexyl) - 4 - aminobutane sulfonic acid; N-(6-aminohexyl)-3-aminopropane sulfonic acid; N-(2-aminoethyl)4-aminobutane sulfonic acid; N-(4-aminobutyl)-4-aminobutane sulfonic acid; and N - (2 - aminoethyl)-3-aminopropane sulfonic acid.

---

This invention relates to novel N-ω-aminoalkylene)-aminoalkyl sulfonic acids and to a process for their production.

It is already known that sultones can be reacted with primary, secondary or tertiary amides to form the corresponding ω-alkylaminoalkyl sulfonic acids. Thus, butylamine and butane sultone react to form N-butylamminobutane sulfonic acid, which exists as an internal ammonium salt. Since amino groups react very quickly with sultones, these reactions can be carried out in water or in alcohol as solvent.

It is an object of this invention to provide (N-(ω-aminoalkylene)-aminoalkyl sulfonic acids having the formula $NH_2$—R—NH—R'—$SO_3H$ wherein R is a bivalent alkylene radical having 2 to 12 carbon atoms and R' a bivalent alkylene radical having 3 to 8 carbon atoms.

It has been found that N-(ω-aminoalkylene)-aminoalkyl sulfonic acids are obtained if aliphatic diamines are reacted with aliphatic sultones, optionally in a solvent, at temperatures from —20 to 100° C., advantageously at —10 to +40° C.

It is surprising that, with this process, only one amino group of the diamine reacts with the sultone, while the second amino group remains unchanged.

The aliphatic diamines used for the process have the general formula $$NH_2—R—NH_2$$

wherein R represents an optionally substituted polymethylene radical. Examples of diamines that may be used include ethylene diamine, propylene - 1,3 - diamine, tetramethylene-1,4-diamine, hexamethylene-1,6-diamine, octamethylene-1,8-diamine and their derivatives which are substituted on one or more carbon atoms, e.g., by alkyl radicals, such as methyl, ethyl or propyl radicals.

The aliphatic sultones used according to the invention have the general formula

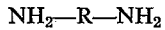

wherein R' represents an optionally substituted polymethylene radical. Especially suitable aliphatic sultones include propane-1,3-sultone and butane-1,4-sultone, as well as their derivatives which are substituted on one or more carbon atoms by alkyl radicals, such as methyl, ethyl or propyl radicals.

The reaction takes place according to the general formula

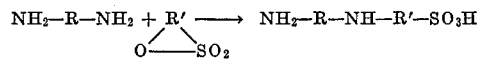

The reaction can be carried out in a solvent. Suitable solvents are all those in which both reactants are soluble without reacting with the solvent, e.g., such aromatic hydrocarbons as benzene, toluene and xylene and such halogenated hydrocarbons as methylene chloride, chloroform, carbon tetrachloride, chlorobenzene and dichlorobenzene.

The reactants are generally reacted in equimolar quantities, but it is also possible to use a relatively large excess of one or other of the two components, which then acts simultaneously as solvent. An additional solvent is not then necessary. If excess sultone is used as solvent, then the reaction should best take place at low temperatures, advantageously at 15 to 40° C.

For the preparation of the addition products, the aliphatic diamine can be dissolved in a hydrocarbon, such as benzene, and then the sultone can be added, all at once or in several portions. It is, however, also possible to add the diamine, all at once or gradually, to a relatively large excess of sultone. Alternatively, the sultone can be added to an excess of the diamine, such as ethylene diamine.

The N - (ω - aminoalkylene)-aminoalkyl sulfonic acids thus obtained by addition reaction are formed in excellent yields as white crystalline substances which are very readily soluble in water and mostly also in methanol. Some of them can satisfactorily be recrystallised from ethanol.

The reaction, as defined, of only one amino group of an alkylene diamine with aliphatic sultones, even when these latter are used in excess, is extremely surprising, since it was hardly conceivable that addition reactions could be carried out selectively on one of two completely similar reactive groups.

The compounds obtained according to the invention are new and some of them have bactericidal and solution-promotion properties.

EXAMPLE 1

464 parts of hexamethylene diamine were dissolved in 1600 parts by volume of benzene, and 560 parts of butane sultone were added while stirring at 10 to 15° C. After 40 hours, the precipitate which formed was filtered off with suction and recrystallised from ethanol. 85% of N-(6-aminohexyl)-4-aminobutane sulfonic acid were obtained.

Equivalent weight: by titration 250 (theoretical: 252).

EXAMPLE 2

116 parts of hexamethylene diamine and 544 parts of butane sultone were combined in 900 parts by volume of benzene while cooling and stirring. After standing for 24 hours at room temperature, the resulting precipitate was suction-filtered and thoroughly washed with benzene. The resulting N-(6-aminohexyl)-4-aminobutane sulfonic acid was recrystallised from ethanol after drying. Yield: 92%.

Equivalent weight: by titration 265 (theoretical: 252).

EXAMPLE 3

116 parts of hexamethylene diamine and 820 parts of butane sultone were combined while stirring and cooling to 20 to 25° C. The reaction mixture solidified after 3 hours. It was left standing for 12 hours at room temperature and filtered off with suction after stirring with ethyl acetate. Recrystallisation from ethanol leads to a yield of 70% of N-(6-aminohexyl)-4-aminobutane sulfonic acid.

Equivalent weight: by titration 248 (theoretical: 252).

EXAMPLE 4

125 parts of propane sultone, dissolved in 100 parts of toluene, were introduced dropwise into a solution of 116 parts of hexamethylene diamine in 400 parts of toluene while stirring at 0° C. After completing the addition, the reaction mixture was kept for 30 hours at room temperature and then suction-filtered. After recrystallation from methanol/water, 90% of N - (6 - aminohexyl) - 3-aminopropane sulfonic acid were obtained.

Equivalent weight: by titration 243 (theoretical: 238).

EXAMPLE 5

60 parts of ethylene diamine were dissolved in 600 parts by volume of benzene and, while stirring and cooling to 10° C., 140 parts of butane sultone were introduced in portions. After 30 hours, the precipitate that was obtained was suction-filtered and recrystallised from methanol/water. N - (2 - aminoethyl) - 4-aminobutane sulfonic acid was obtained in 75% yield.

Equivalent weight: by titration 202 (theoretical: 196).

EXAMPLE 6

44 parts of tetramethylenediamine were introduced at 10° C. into 820 parts of butane sultone while cooling and stirring. After the reaction mixture solidified, it was left standing for another 12 hours at 25° C. and then extracted by stirring in ethyl acetate. After dissolving and reprecipitating the suction-filtered crystals from ethanol/ethyl acetate, 90% of N-(4-aminobutyl)-4-aminobutane sulfonic acid were obtained.

Equivalent weight: by titration 236 (theoretical: 224).

EXAMPLE 7

136 parts of butane sultone were introduced dropwise into 700 parts by volume of ethylenediamine while stirring and cooling to 10 to 15° C. Stirring was continued for another 12 hours at 25° C. and then the excess ethylenediamine was evaporated at 40 to 50° C. in water jet vacuum. The oily residue crystallised after adding ethanol and was recrystallised from methanol/water. N-(2-aminoethyl)-4-aminobutane sulfonic acid was obtained in a yield of 73%.

Equivalent weight: by titration 198 (theoretical: 196).

EXAMPLE 8

122 parts of butane sultone were reacted with 600 parts by volume of ethylene diamine in accordance with Example 7, and, after recrystallisation from methanol/ethanol, a 68% yield of N-(2-aminoethyl)-3-aminopropane sulfonic acid was obtained.

Equivalent weight: by titration 182 (theoretical: 182).

EXAMPLE 9

136 parts of butane sultone were introduced dropwise into 384 parts of tetramethylene diamine whilst stirring at 35 to 40° C. After completing the addition, the mixture was left standing for 12 hours at 25° C. and then 1500 parts by volume of benzene were incorporated by stirring. The crystals that formed were recrystallised from ethanol after being suction-filtered. The result was 83% of N-(4-aminobutyl)-4-aminobutane sulfonic acid.

Equivalent weight: by titration 233 (theoretical: 224).

What we claim is:

1. A process for the production of N-($\omega$-aminoalkylene)-aminoalkyl sulfonic acids, which comprises reacting an alkylene diprimary amine having about 2 to 12 carbon atoms in the alkyl group with an alkyl sultone wherein said alkyl group is selected from the group consisting of alkyl groups having about 3–4 carbon atoms and alkyl groups having about 3–4 carbon atoms substituted by an alkyl group containing up to about 3 carbon atoms at temperatures from −20 to +100° C., said reacting being effected in the presence of a solvent selected from the group consisting of an aromatic hydrocarbon and a halogenated hydrocarbon and recovering from the reaction medium the formed N - ($\omega$ - aminoalkylene) - aminoalkyl sulfonic acid wherein said reaction is carried out in an excess of said alkyl sultone.

2. The process according to claim 1, wherein said solvent is benzene.

References Cited

UNITED STATES PATENTS

| | | | |
|---|---|---|---|
| 2,109,401 | 2/1938 | Nicodemus et al. | 260—513 |
| 3,280,179 | 10/1966 | Ernst | 260—501 |

FOREIGN PATENTS

| | | |
|---|---|---|
| 834,205 | 8/1938 | France. |
| 406,788 | 3/1934 | Great Britain. |
| 452,584 | 8/1936 | Great Britain. |
| 764,340 | 12/1956 | Great Britain. |

DANIEL D. HORWITZ, Primary Examiner

U.S. Cl. X.R.

260—999